United States Patent [19]
Soule

[11] 3,834,758
[45] Sept. 10, 1974

[54] SAFETY BELT FOR USE ON MOTOR VEHICLES

[76] Inventor: Frank A. Soule, P.O. Box 744, Los Gatos, Calif. 95030

[22] Filed: Mar. 1, 1973

[21] Appl. No.: 337,066

[52] U.S. Cl............... 297/389, 2/338, 280/150 SB
[51] Int. Cl............................................. A62b 35/00
[58] Field of Search .......... 297/389, 385, 386, 390, 297/387, 384; 2/326, 327, 328, 329, 338; 280/150 SB

[56] References Cited
UNITED STATES PATENTS

| 959,681 | 5/1910 | Young .................................... | 2/328 |
| 1,446,867 | 2/1923 | Young .................................... | 2/328 |
| 2,940,149 | 6/1960 | O'Connor ......................... | 24/206 R |
| 3,178,224 | 4/1965 | Anderson et al. ................... | 297/385 |
| 3,228,726 | 1/1966 | Peterson ............................. | 297/385 |
| 3,321,247 | 5/1967 | Dillender ............................ | 297/389 |
| 3,428,029 | 2/1969 | Klickstein et al. ............... | 297/389 X |
| 3,529,864 | 9/1970 | Rose et al. ......................... | 297/387 |

FOREIGN PATENTS OR APPLICATIONS

| 724,022 | 12/1965 | Canada ............................... | 297/389 |
| 515,818 | 12/1939 | Great Britain ...................... | 297/389 |
| 1,310,485 | 10/1962 | France .............................. | 297/389 |

*Primary Examiner*—James T. McCall

[57] ABSTRACT

A safety belt vest for use on motor vehicles to restrain the vehicle occupants in the event of accident or abrupt stopping of the vehicle. This safety device is provided with two straps that pass completely around the back of the seat and these may be anchored to the frame of the vehicle. A lap strap is provided around the abdomen of the passenger and a shoulder harness is provided with loops for attaching it to the buckle of the lap strap so that the strap and shoulder harness may be quickly released by releasing the buckle of the strap. The inner surfaces of the back straps are provided with a plurality of spaced members for receiving the shoulder harness therebetween so that the vertical position of the shoulder harness may be adjusted whereby the safety device may be adjusted for use by children or adults.

3 Claims, 5 Drawing Figures

PATENTED SEP 10 1974    3,834,758

SAFETY BELT FOR USE ON MOTOR VEHICLES

DESCRIPTION OF THE INVENTION

This invention relates to safety belt vests for use on motor vehicles to restrain passengers thereof in the event of collision or abrupt stoppage of the vehicle.

An object of this invention is to provide an improved safety belt vest having a shoulder harness that is adjustable so that the safety device may be used either by children or adults.

Another object of this invention is to provide an improved safety device for use by passengers in a motor vehicle, said safety device being provided with a shoulder harness and a lap strap, both of which are held assembled by a buckle made so that the passenger may either quickly attach or detach the device.

Other and further objects of this invention will be apparent to those skilled in the art to which it relates from the following specification, claims and drawing.

In accordance with this invention there is provided a safety device for use on motor vehicles to restrain the passengers if the motor vehicle is involved in an accident or if it is brought to an abrupt stop. This device is provided with two spaced back straps which pass completely around the back of the seat and which may be anchored to the frame of the vehicle. The device includes a shoulder harness which passes around the inner sides of the back straps which are provided with spaced retaining means for retaining the shoulder harness at predetermined desired elevations selected so that the harness may be used either by children or adults. The ends of the shoulder harness are provided with loops so that these ends may be attached to the buckle of the lap strap. Thus the safety device may be quickly assembled by the passenger preparing to use it or it may be quickly detached when it is desired to release it.

Further details and features of this invention will be set forth in the following specification, claims and drawing, in which, briefly:

Figure 1B:
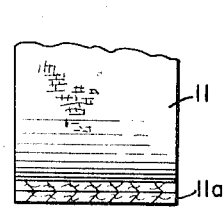
FIG. 1B is a sectional view taken along the line 1B-1B of FIG. 1A.
Figure 1:
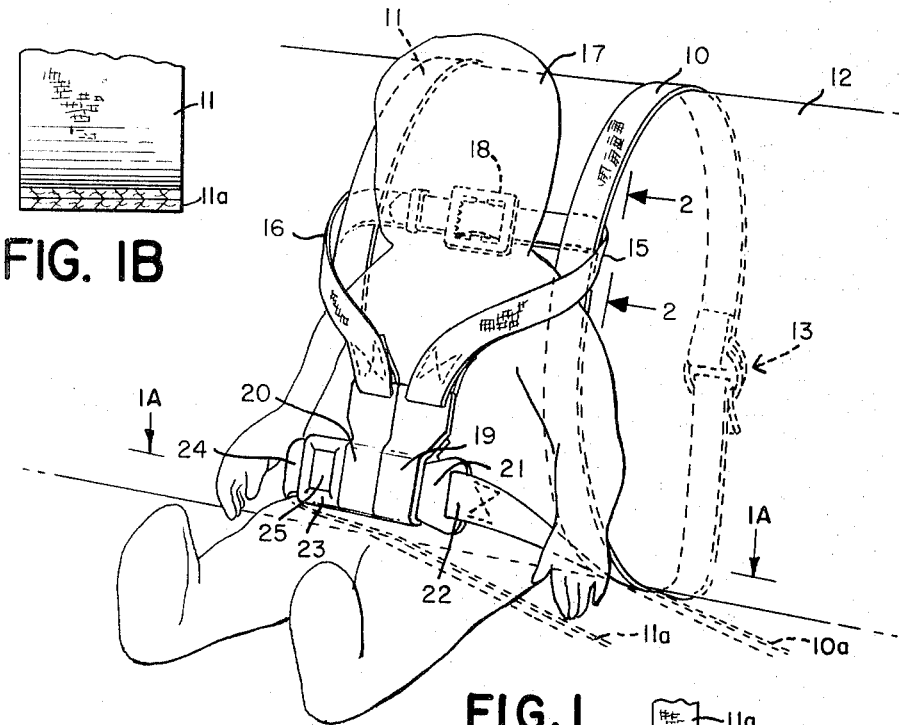
FIG. 1 is a perspective view of this safety device assembled around a passenger shown in broken outline, said passenger in this case being a small child.

Referring to the drawing in detail, reference numerals 10 and 11 designate two spaced back straps which are shown looped around the back 12 of the vehicle seat. The back straps 10 and 11 may be anchored to the floor of the vehicle by straps 10A and 11A respectively. These straps are each provided with a buckle such as the buckle 13 shown attached to the strap 10. The buckle 13 is of conventional construction and employs two rings which are attached to one end of the strap and the other end of the strap is looped around one of the rings and under the other of said rings so that said rings provide a frictional grip on the looped strap.

Figure 2:
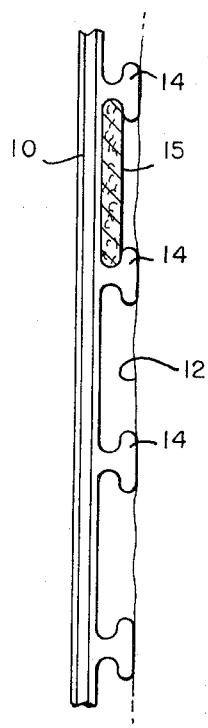
FIG. 2 is a sectional view of one of the back straps showing the shoulder harness retaining elements attached to the strap.
Figure 3:
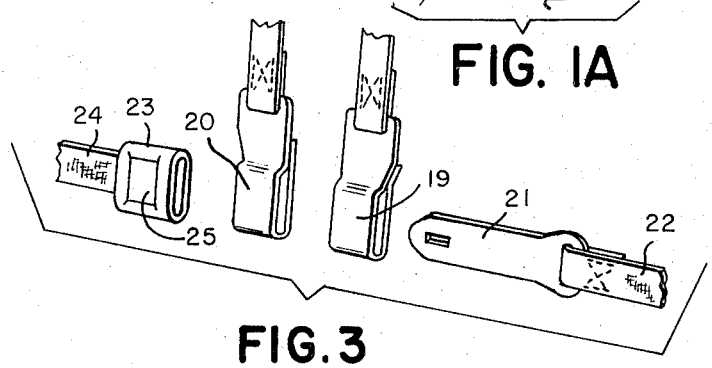
FIG. 3 is an exploded view of the lap strap latch and the loops provided to the ends of the shoulder harness.

The straps 10 and 11 are each also provided with spaced button-shaped elements 14 on the inside thereof adjacent to the front surface of the seat back as shown in FIG. 2. The button-shaped elements 14 are spaced apart a sufficient distance to receive the shoulder harness straps 15 and 16 and retain these straps at the desired elevation corresponding to the shoulder height of the passenger 17. Thus, when the passenger is a child the shoulder straps 15 and 16 are lowered on the back straps 10 and 11, respectively, to be just above shoulder height of the passenger. On the other hand if the passenger is an adult then the shoulder straps 15 and 16 are elevated on the back straps 10 and 11. The shoulder straps are held at the proper elevation by the retaining elements 14 selected for receiving the shoulder straps. One end of the strap 15 is threaded through the buckle 18 that is attached to the adjacent end of the strap 16 and this buckle is adjacent to the back 12 of the seat.

Figure 1A:
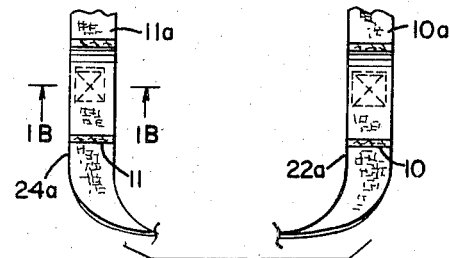
FIG. 1A is a sectional view taken along the line 1A-1A of FIG. 1 to show the opposite ends of the lap strap attached to the spaced back straps.

Loops 19 and 20 which may be of metal, plastic, or the like, are attached to the forward ends of straps 15 and 16, respectively. An elongated tongue 21 is attached to the end 22 of the lap strap and this tongue is inserted into the loops 19 and 20 and into the latch 23 which is attached to the end 24 of the lap strap. The latch 23 is of conventional construction and it is provided with a release button 25 which must be pressed when it is desired to pull the tongue 21 out of the latch to release the lap strap and shoulder harness. The end 22A of the lap strap is attached to the back strap 10 as shown in FIG. 1A and the end 24A of the lap strap is attached to the back strap 11 also as shown in this figure.

While I have shown and described a preferred form of the invention it will be understood that the invention is capable of variation and modification from the form shown and should be limited only by the scope of the claims appended hereto.

What I claim is:

1. A safety device for use on motor vehicles to restrain the vehicle occupants in the event of abrupt stopping or accident comprising the combination of a pair of spaced substantially parallel back straps positioned completely around the back of the vehicle seat, a lap strap attached to said back straps, said lap strap having a quickly detachable buckle joining parts thereof, a shoulder harness, means holding said shoulder harness at any selected level of a plurality of predetermined levels on said back straps so that said shoulder harness may be adjusted for children and adults utilizing the device, and means detachably attaching the front ends of said shoulder harness to said lap strap buckle.

2. A safety device for use on motor vehicles to restrain the vehicle occupants in the event of abrupt stopping or accident comprising the combination as set forth in claim 1, further characterized in that said means holding said shoulder harness comprises a series of spaced projections on each of said back straps said projections being positioned on said back straps at predetermined levels for holding said shoulder harness at a selected level, and means holding said projections fixedly attached to said back straps.

3. A safety device for use on motor vehicles to restrain the vehicle occupants in the event of abrupt stopping or accident comprising the combination as set forth in claim 2, further characterized in that said projections and said means holding said shoulder harness provided to each of said back straps comprise a unitary structure made of plastic.

* * * * *